United States Patent [19]

Ney

[11] Patent Number: 4,861,255

[45] Date of Patent: Aug. 29, 1989

[54] MIXING ORIFICE EXTRUDER

[76] Inventor: Robert J. Ney, 4215 E. Bay Dr., Ste. 1103 B, Clearwater, Fla. 34624

[21] Appl. No.: 90,702

[22] Filed: Aug. 27, 1987

[51] Int. Cl.⁴ .............................................. A23G 9/12
[52] U.S. Cl. .................................... 425/202; 366/286; 366/316; 425/376.1
[58] Field of Search ..................... 366/285, 286, 316; 425/200, 202, 376.1

[56] References Cited

U.S. PATENT DOCUMENTS

| | | | |
|---|---|---|---|
| 410,822 | 9/1889 | Day | 425/202 X |
| 660,185 | 10/1900 | Franklin | 366/286 X |
| 2,626,135 | 1/1953 | Serner | 366/316 |
| 3,999,889 | 12/1976 | Caulk et al. | 366/316 X |
| 4,499,445 | 2/1985 | Mitchell | 366/316 |
| 4,506,989 | 3/1985 | Reh | 366/286 X |
| 4,548,508 | 10/1985 | Verkler | 425/200 X |
| 4,668,561 | 5/1987 | Ney | 425/202 |

*Primary Examiner*—Charles Hart

[57] ABSTRACT

An apparatus for converting hard frozen confection to soft frozen confection, by single servings, flavoring and extruding it, is described. A super fresh product with outstanding flavor and consistency is produced. Fruit additions remain soft and flavorful, not frozen; cookie additions remain crisp, not soggy as in ordinary ice cream. Hundreds of flavor combinations become practical to make. The invention utilizes a piston and cylinder to pressurize the product for extrusion, and a special rotating wheel, on a retractable shaft thru the piston, that performs the mixing, cutting, milling, and sweeping functions. Aggregates are swept into a central extrusion orifice by this wheel. The commercial version of the apparatus requires 1/10 HP to operate, and weighs 62 pounds. The "household" version of this machine weighs 30 pounds.

6 Claims, 1 Drawing Sheet

MIXING ORIFICE EXTRUDER

BACKGROUND OF THE INVENTION

In the last few years, there has been considerable interest in "soft-serve" ice cream, yoghurt and various non-dairy frozen confections, that are custom flavored by individual servings. There are some machines on the field, that will mix and soften a "hard-scooped" product. Frequently the mixing and softening is done by hand, on a board with a spatula. The available machines fall into two categories: one type is a screw extruder, it utilizes a conical screw, and a matching conical cup with an orifice at its apex. This machine extrudes the product onto a cone or dish. Although this machine has been on the market for decades, and can produce an excellent product, it did not become universally accepted for various reasons. The other type of machine, is more recent; it is a heavy duty high speed spinner-mixer. It produces a semi-liquid product to be served in a cup with a spoon.

The subject invention utilizes a piston and cylinder for pressurizing the product for extrusion, a special rotating wheel on a retractable shaft to mix, cut, and sweep the aggregates into an extrusion orifice. This invention is related to a device described in my U.S. Pat. No. 4,668,561 titled "Confection Mixing Chopping and Extruding Apparatus", dated May 26 1987. The preferred embodiment of the subject invention is considerably more efficient in handling "hard" aggregate additions, it is more reliable in operation, it is considerably smaller and lighter in weight, and its manufacturing cost is only slightly higher than that of the preferred embodiment of said prior patent.

The state of the art frozen confection screw extruders require ½ to ¾ horse-power motors to operate, while the subject device requires 1/10 to 1/20 horse-power input, for a similar capacity 3 inch diameter loading cup. Although this process takes a few seconds longer to accomplish, it resulted in a significantly less critical operation, since it is relatively easy to liquify a frozen confection by rapid "over-agitation". Ideally every part of the confection charge should receive the same amount of energy addition by agitation. In screw extruders, operating in the batch mode, the "tail end" of the product gets more agitation than the "front end", hence there is a tendency to over-soften the "tail end" of the product. The subject piston and cylinder mixer device, tends to soften the product uniformly, since it agitates only a small fraction of the total charge at a time, for equal time periods.

BRIEF DESCRIPTION

The subject device consists of a piston, a cylindrical cup with an orifice at its bottom, and a special rotating wheel that serves 3 main functions, such as mixing, cutting, and sweeping (m/c/s). This m/c/s wheel has involute shaped thru channels directed toward its center, and it is motor driven via a spring loaded retractable shaft, thru a bore on the center line of the piston. In operation the cup is filled with a frozen confection base, for example hard vanilla yoghurt, and aggregates and/or syrup is added. Then the rotating m/c/s wheel is traversed thru the confection charge, this results in a coarse mixing and chopping of the large aggregate additions. When the rotating m/c/s wheel engages the bottom of the cup, the piston simultaneously engages the lip of the cup, and starts to pressurize the charge. Channels in the m/c/s wheel are shaped such that they tend to sweep the charge into a central extrusion orifice in said cup. The combined action of the piston and of the rotating m/c/s wheel extrude the charge. Softening of the frozen confection occurs as it passes thru the sweeper channels, due to mechanical work addition. Heat generated by friction at the cup to sweeper interface surfaces, further softens the frozen confection charge. It is noted that in the subject device, substantially only the region of the rotating m/c/s wheel is agitated, and from there the charge is extruded directly. Since this region is a small fraction of the total volume of the loading cup, a relatively uniform energy addition, hence relatively uniform softening occurs.

There is a milling action at the m/c/s wheel to cup interface; this action may be enhanced by beveling the trailing edges of some of the sweeper channels, this will result in forcing more aggregates under the m/c/s wheel. The bottoms of the loading cup and of the piston are grooved in a generally radial direction; this results in a cutting or shearing action with the channels in the m/c/s wheel. These grooves tend to guide the aggregates toward the central extrusion orifice. These grooves also tend to stop the rotation of the charge along with the m/c/s wheel channels. This rotation would of course negate any radial sweeping action. In screw extruders, the rotation of the charge with the screw is a frequent problem, even with rifled cylinder bores.

The piston and motor mounts are stationary, while the cup is driven into the piston by a handle-bar actuated "rack and pinion" drive. On the prototype, the m/c/s wheel drive motor is a high torque relatively low speed gear-motor; it is actuated by a micro-switch, when the m/c/s wheel engages the loading cup.

The force required to extrude the charge is substantially functions of: the viscosity of the base stock at extrusion temperature, the consistency of the aggregate additions at extrusion temperature, the ratio of the amount of aggregates to the base confection stock, the size of the aggregate additions, the exit passage areas and configuration, the pressure developed by the sweeper, the rate of extrusion, the piston diameter, the mechanical advantage and the friction of the vertical drive system, and the weight of the vertical moving system. As the vertical actuator handle-bar or lever is depressed, the force required is relatively small, until the piston engages the loading cup. At this point maximum convenient force is applied to the handle-bar; if this force is not sufficient to initiate extrusion, the m/c/s wheel continues to turn and it continues to soften the charge in the vicinity of the extrusion orifice. The rate of change of the viscosity of the frozen confection is very rapid between "dipping" and "soft serve" temperatures. At some temperature or value of viscosity, the extrusion will start. Generally, once extrusion has started, if pressure is maintained, it will continue until substantially the entire charge has been extruded.

The important parameters in determining the final consistency of the product are: the initial temperature and viscosity of the confection base and aggregates, the rate of change of viscosity with temperature of the confection and aggregates, the initial temperature of the loading cup, the amount of confection base to aggregate ratio, the rate of extrusion, the magnitude of the spring loading on the m/c/s wheel, the extrusion orifice size and configuration, and the speed and configuration of the m/c/s wheel. It is expedient, for fast operation, and for avoiding an "over softened" product, to pre-load the cup with the confection base, and refrigerate it to between 0 and 5 degrees F. The various aggregate and syrup additions should be refrigerated to about 40 degrees F. Space should be provided in the loaded cup, for the aggregate and/or syrup additions. This can be accomplished by traversing a small plunger, at the inside circumference of the confection loaded cup, from the top to the bottom of the said cup. The m/c/s wheel, as it passes thru the charge, will distribute the additions toward the center of the loading-cup. Stainless steel cups can be recycled considerably faster than plastic cups, the thermal diffusivity (rate of heat front propagation) of the stainless steel used is 2,360 times higher than that of the plastic used. The boundary layer or surface heat transfer rate is substantially the limiting factor in the speed of response of the stainless steel cup. With plastic cups, the thermal diffusivity of the plastic is an important parameter in limiting the speed of response. Moreover, the dimensional stability of stainless steel is considerably higher than that of plastics, so that cups with ⅛ inch walls and flange reinforced lips may be used.

Due to the greatly increased dimensional stability of the stainless steel, piston to cup bore clearances can be made and maintained such that a "O" ring seal on the piston is not needed. The stainless steel cups cost considerably more than the plastic ones.

It is of course imperative to the success of this device, to clearly meet local Health Department standards. Two approaches may be taken to accomplish this task: demount the piston and m/c/s wheel and wash them, wash and reload the cup, and wipe off the drive shaft; or demount and recycle the loading cup, and immerse the m/c/s wheel, the drive-shaft and the piston in a continuous flow water pan in situ.

It is also required that no tools shall be needed to demount said components. In the working model, both loading cup and piston are bayonet mounted, while the m/c/s wheel is mounted on a three-turn screw stud. It takes less than 7 seconds to remove the m/c/s wheel, cup and piston; and about 10 seconds to remount, fo a new operator after a few hours of practice.

The prototype commercial machine has an aluminum frame, for light weight, ease of machining and welding, and for corrosion resistance. It has a stainless steel cabinet. Said machine weights 62 pounds; it is 30 inches high, 12 inches wide, and 16 inches deep. This weight and size is highly suitable for commercial applications. The above weight can be reduced to 30 pounds, and the size can be reduced by 30 %, for less severe household applications.

DETAILED DESCRIPTION

Figure 1:
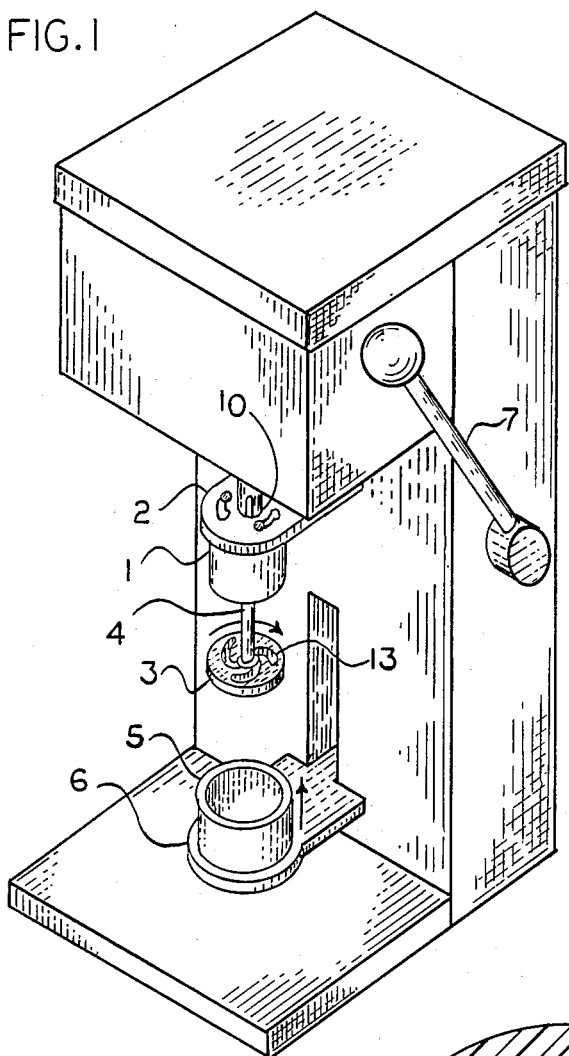
FIG. 1 is an isometric elevational view of the complete device, with the loading cup at its loading, or lowest position.
Figure 2:
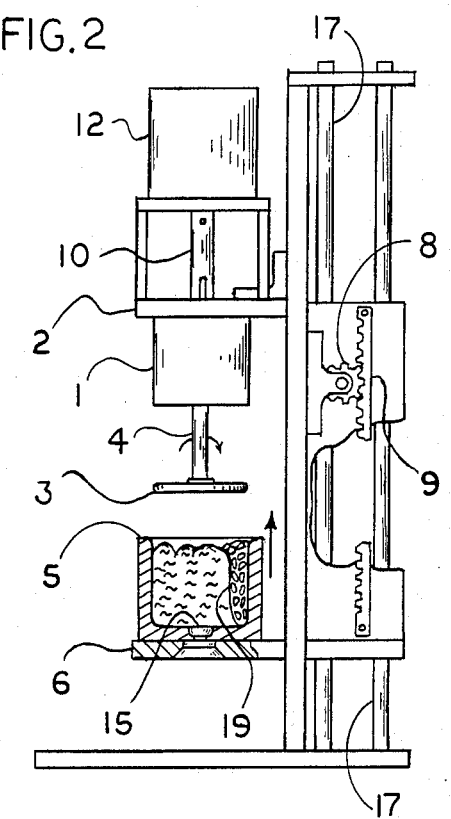
FIG. 2 is an elevational side view of the device, without the cover, showing a sectional view of the extruder, and a view of the vertical drive assembly, with the loading cup at a position just prior to engaging the mixer/cutter/sweeper (m/c/s) wheel.
Figure 5:
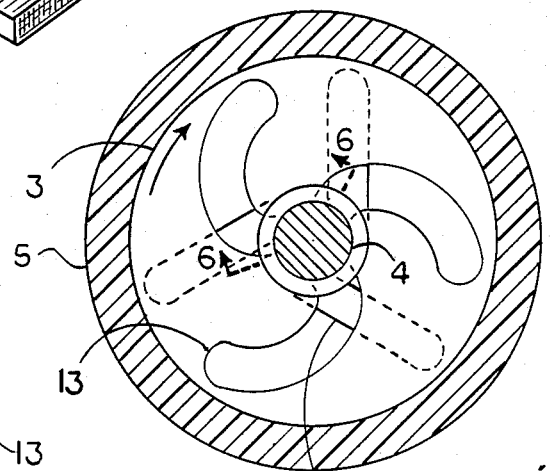
FIG. 5 is a top view of the m/c/s wheel, and of the cutter/guide grooves in the bottom surface of the loading cup.

Referring now to the figures, wherein all numerals refer to the same component thruout; in the preferred embodiment of this invention, piston 1 is stationary and it is bayonet mounted to support plate 2 (FIGS. 1 & 2). Said support plate 2 is rigidly mounted to the frame of the machine. Piston 1 is typically made of high density, snow white colored, high impact and heat resistant plastic. Piston 1 generally requires a grooved "O" ring seal, if mated to plastic cups, since plastic cups tend to deform slightly in use. Said "O" ring seals are not required with stainless steel cups with flange reinforced lips. Spring loaded retractable shaft 4 extends from a close fitting bore at the center of piston 1. A mixer/cutter/sweeper (m/c/s) wheel 3 is mounted on said shaft 4. Piston 1 is mounted concentric with confection loading cup 5, said loading cup 5 is bayonet mounted on a vertically movable carriage plate 6. The loading cup 5 is made of either the same material as said piston 1, or it may be made of a high chrome-nickel stainless steel. The cup is sized for a 4 to 6 ounce serving of confection; this results in a 3 inch deep cup, for a 3 inch diameter bore. Said carriage plate 6 is driven vertically by lever 7, thru rack 8 and pinion gear 9 drive (FIG. 2). The gear 9 diameter and lever 7 orientation etc. are chosen such, that lever 7 is near its top-most position (FIG. 1), when the loading cup 5 is at its lower-most position. One full revolution of lever 7 brings cup 3 into engagement with piston 1 (FIG. 3), an additional ⅜ revolution of lever 7 completes the extrusion cycle (FIG. 4). Retractable shaft 4 is guided by barrel 10, said barrel 10 also contains a compression spring, for spring loading shaft 4 in the down or extended position. Said barrel 10 is keyed to retractable shaft 4, so that it will transmit torque from drive motor 12. Motor 12 on the working model is a high efficiency permanent split capacitor gear-motor, of 1/20 HP rated input. It has a speed of 32 RPM, and an output torque of 96 inch-pounds; it weighs 6.2 pounds. Since the cutting surface area and the radius of the m/c/s wheel 3 are relatively small, 96 inch-pounds of torque is more than sufficient to drive it, even in the most severe conditions. Typically this occurs at cutting frozen caramel aggregates. The m/c/s wheel 3 is typically ⅜ inch thick, and substantially covers the entire bore diameter of cup 5. Said m/c/s wheel 3 contains three involute shaped channels 13, spaced 120 degrees apart on said m/c/s wheel 3. The intersection of said involute with a radial line moves at a constant linear velocity, as the m/c/s wheel is rotated at a constant angular velocity, thereby imparting a constant "drive" upon the fluid in said channels. Said channels 13, when rotated and traversed thru the confection charge in loading cup 5, tend to distribute the aggregate additions toward the center-line of said cup 5, when the aggregate are placed at the cylindrical wall of loading cup 5. Due to the above design parameters a relatively low rotational speed is sufficient to do an effective coarse mixing, in a few seconds. Fine mixing, chopping, milling, and sweeping action occurs at the engegement of the spring loaded m/c/s wheel 3, with the grooves 14 (FIG. 5.) on the bottom surface of loading cup 5. Said grooves 14, in co-operation with rotating channels 13, are sweeping the aggregate additions toward the central extrusion orifice 15. Effective shearing action takes place at the intersections of the shearing edges, of rotating channels 13 and stationary grooves 14. For plastic cups 5, a stainless steel insert disc is bonded onto the bottom surface of said cup 5, said insert contains grooves 14. A similar steel insert disc, with grooves 14, is bonded onto the bottom surface of piston 1, in order to improve the wear resistance of said shearing edges. Said stationary grooves 14 are necessary to eliminate the compaction of "hard" aggregates such as frozen caramel or chocolate chips, between the top of the m/c/s wheel 3, and the bottom surface of piston 1, near the end of the extrusion process. Said compacted aggregates would otherwise rotate with the m/c/s wheel, thereby negating any cutting or sweeping action. It is noted that a piston and cylinder extruder is a positive displacement device for fluids, while the screw and cylinder extruder is not a positive displacement device. Piston and cylinder devices will invariably extrude fluids out of an orifice in the cylinder head, if sufficient force is applied onto said piston. Screw and cylinder type extruders "slip" when the cylinder head pressure is excessive, and the extrusion hence seizes. Of course "hard" aggregates contained in said fluids will not be completely extruded even by the piston and cylinder device. Hard aggregates tend to hang-up at the cylinder head, without any sweeping action. The rotating involute shaped channels 13 in m/c/s wheel 3, in conjunction with grooves 14, effectively sweep the aggregates into central extrusion orifice 15. Said m/c/s wheel 3 can be considered as a planar screw or auger. The flow of the confection due to the piston force, at the channel 13 exit ports and extrusion orifice 15 entrance region, tends to force the aggregate along the fluid flow direction. Due to the positive displacement of cylindrical cup 3 by piston 1, the only charge that can possibly remain in the extruder, is in said channels 13 and grooves 14. Said channels and grooves have a relatively small volume; about 1.2 cubic inches or about 6% of the total volume of the loading cup. Said involute shaped channels 13, grooves 14, and diverter plates 18 in operation, substantially drive the "hard" aggregates out thru the exit orifice. Experiments indicate that only a trace of the "hard" aggregates and confection base remain in the channels 13 and grooves 14. In most cases, if batches of confection are made in rapid succession, the m/c/s wheel 3 need not be cleaned between batches, since no significant flavor mixing will occur. The grooves 14 have large radius fillets, so that material can not stick to corners.

Figure 3:
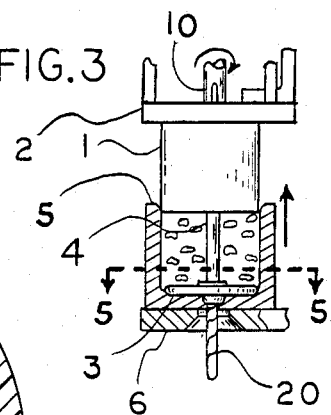
FIG. 3 is an elevational sectional view of the piston, cup, and m/c/s wheel at the piston to cup engagement position.
Figure 4:
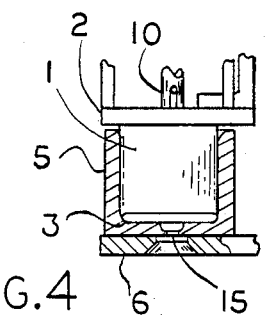
FIG. 4 is an elevational sectional view of the piston, cup, and m/c/s wheel at the position of a completed extrusion cycle.

When the m/c/s wheel 3 engages the bottom surface of loading cup 5, simultaneously the bottom surface of piston 1 engages the lip of said cup 5 (FIG. 3). As lever 7 is further depressed, piston 1 begins to displace and extrude the charge contained in cup 5, simultaneously the bottom surface of cup 5 begins to exert force on the m/c/s wheel 3, and consequently drive-shaft 4 begins to retract into barrel 10, compressing the loading spring. There is no severe space limitation on the size of said barrel 10, so that a long cycle life (100,000+) spring may be readily implemented. At the end of the extrusion cycle, the bottom surface of piston 1 engages the top surface of m/c/s wheel 3 (FIG. 4). Provisions must be made so that said m/c/s wheel 3 is not stalled by "pinching" it between the bottom surfaces of piston 1 and cup 5. One way to accomplish this is by placing appropriate mechanical stops on carriage guide rods 17, and adjust them to stop said carriage plate 6, about 0.010 inch before "pinching" would occur.

Figure 6:
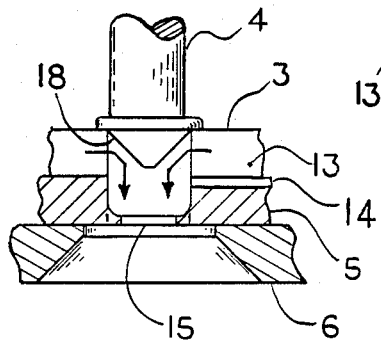
FIG. 6 is an elevational sectional view of the extrusion orifice region, showing the channel exit ports and the 45 degree diverter plates.

As the charge is extruded thru the three channels 13, considerable mixing occurs as the three streams converge at the entrance section of extrusion orifice 15. Since said streams flow in the radial direction, they tend to "buck" each other as they converge toward the orifice axis. This condition, with "hard" aggregates, can actually block any further flow. For this reason, 45 degree diverter plates 18 (FIG. 6) are placed on the m/c/s wheel, above said extrusion orifice 15, facing the channel exit ports. The rotation of the m/c/s wheel 3 imparts a rotation to the extruded stream 20, the star shaped stationary extrusion orifice thus produces a screw shaped extrusion. It is noted that the operator has considerable control over obtaining coarse or fine mixing of the charge. A rapid extrusion of the aggregate filled charge results in considerable striation of the base confection, with the large aggregates left in the final product. While slow extrusion results in fine mixing chopping and milling of the product. It is of course possible to change the extrusion rates during the extrusion cycle. The results are too numerous to describe here, for various fruit, cookie, chocolate, nuts and candy aggregates. However, it was found for all said aggregates, except fruit, that the subject device tends to concentrate the aggregates at the "tail" end of the extrusion, or onto the top of the finished batch, which is generally desirable for aesthetic considerations. Care must be taken so that the frozen confection is not over agitated. The coefficients of heat capacity Cp of frozen confections are in the range of 0.7 to 0.95 BTU/lb °F., depending on water content. The rate of change of their viscosity with temperature is extremely high; for vanilla ice cream containing 14% butterfat, with no hardening agents added, the "hard scooping" temperature is about 0 degrees F., while at 15 degrees F. it will soon drip if served in the summer-time, so that it is unsuitable for serving on cones. The final temperature of the above confection after the "softening/mixing" process should be limited to about 12 degrees F. To illustrate the work energy to thermal energy relationship for frozen confection, the basic conversion factor 1 Horse Power=0.7073 BTU/second is applied. Using 0.8 for the coefficient of heat capacity Cp, a 4 ounce charge at 1/10 HP input rate, requires 14.4 seconds of operation for a temperature increase of 5 degrees F. The assumptions are made that there is no net heat transfer by conduction to the charge, and that the energy addition is uniform over the entire volume of the charge. These are valid assumptions if the loading cup is refrigerated to 0 degrees F., and if a "small" agitator uniformly applies energy to the charge, as in the subject device.

It was noted in practice, that cookie additions tend to add "body" to the product, while fruits tend to make it "soupy", as anticipated. For producing a "firm" serving, un-frozen fruit additions should be limited to about 10% of the total charge by weight, and chopped (by the MO/Extruder) to "chunks" generaly no smaller than ½ inch cubes. In practice, for example, to produce fresh banana ice cream, one half of a medium size fruit may be added (whole) to a 4 ounce charge of vanilla ice cream at 0 degrees F. The resulting un-frozen "chunks" of fruit aggregates in the confection, placed on a cone, may be called: "sundae on a cone". It was observed that cookie aggregates remain crisp; they never "see" water as in standard processing. An additional advantage of this method of soft frozen confection dispensing, for ice cream or yoghurt parlours, is that this product inherently can not be packaged for supermarkets. The "hardened" product was developed for storage and low cost dispensing purposes, and it became a habit with many people. Actually, soft ice cream has a more intense taste, with much smaller amounts of flavoring, because it does not numb the taste buds as much as the hard product.

The subject Mixing Orifice Extruder may be mated to a "batch freezer" (ice cream machine). The confection base may be injected into loading cup 5 by said integral "batch freezer"; the purposed new device should be considered to be entirely within the scope of this invention. Pre-formed cylinders of frozen confection base, with pockets 19 (FIG. 2) for insertion of the flavoring addatives, may also be used for charging loading cup 5. The advantage of these loading methods are: increased speed of operation and accurate metering of the servings. A tamper resistant counter with a key reset may be provided to count the completed extrusions, for "cash" control purposes.

It will be appreciated by those skilled in the art, that this invention may take various embodiments other than the illustrative embodiments heretofore described. Accordingly, I intend by the following claims to cover all modifications within the spirit and scope of my invention.

What I claim is new and desire to secure by Letters Patent of the United States is:

1. A food mixing, chopping and extrusion apparatus comprising: a piston and a cylindrical cup for pressurizing the charge for extrusion with a mixing cutting and sweeping device mounted on a retractable shaft extending into said cylindrical cup having an extrusion orifice in its bottom wall said mixing cutting and sweeping device being a rotating wheel having through channels for mixing and cutting aggregates in a confection charge said rotating wheel sweeps the aggregates into said extrusion orifice of said cylindrical cup and said channels of said rotating wheel being provided with trailing edges wherein said trailing edges of said channels are beveled in order to force more of the aggregates in a charge under said wheel and in co-operation with said bottom surface of said cylindrical cup mill said aggregates.

2. The invention as described in claim 1, wherein said cylindrical cup is loaded with a pre-formed frozen substantially cylinder shaped confect charge and space is provided in said preform for flavoring additives.

3. The invention as described in claim 1, wherein said channels are involute shaped.

4. The invention as described in claim 1, wherein said piston and cup contain generally radial grooves on their bottom surfaces said grooves co-operating with said rotating channels impart a shearing action onto the charge with any aggregates and direct said charge to said extrusion orifice.

5. The invention as described in claim 1, wherein said apparatus is mated to a batch freezer and said cylindrical cup is loaded with the confection base from said integral batch freezer.

6. The invention as described in claim 1, wherein diverter plates are placed on said wheel at the exit ports of said channels to re-direct the flow along the axis of said extrusion orifice.

* * * * *